R. C. HAKE AND A. V. VISSATA.
HEADLIGHT CONTROLLING MECHANISM FOR AUTOMOBILES.
APPLICATION FILED MAR. 6, 1917.

1,331,913. Patented Feb. 24, 1920.

Inventors:
RICHARD C. HAKE AND ANTHONY V. VISSATA,
By John H. Bruninga.
Their Attorney.

UNITED STATES PATENT OFFICE.

RICHARD C. HAKE AND ANTHONY V. VISSATA, OF ST. LOUIS, MISSOURI.

HEADLIGHT-CONTROLLING MECHANISM FOR AUTOMOBILES.

1,331,913. Specification of Letters Patent. Patented Feb. 24, 1920.

Application filed March 6, 1917. Serial No. 152,844.

*To all whom it may concern:*

Be it known that we, RICHARD C. HAKE and ANTHONY V. VISSATA, both citizens of the United States, and residing at St. Louis, in the State of Missouri, have invented a certain new and useful Improvement in Headlight-Controlling Mechanism for Automobiles, of which the following is a specification.

This invention relates to headlight controlling mechanism for automobiles, which is adapted to direct the rays in the direction in which the automobile is turned by the steering mechanism.

One of the objects of this invention is to construct mechanism which can be readily applied to an existing automobile, which will be firmly supported, so as to avoid lost motion and inaccuracy of operation, and which will be reliable.

Another object is to provide mechanism which is simple in construction and operation, and cheap to manufacture.

Further objects will appear from the detail description taken in connection with the accompanying drawing, in which.

Figure 1:
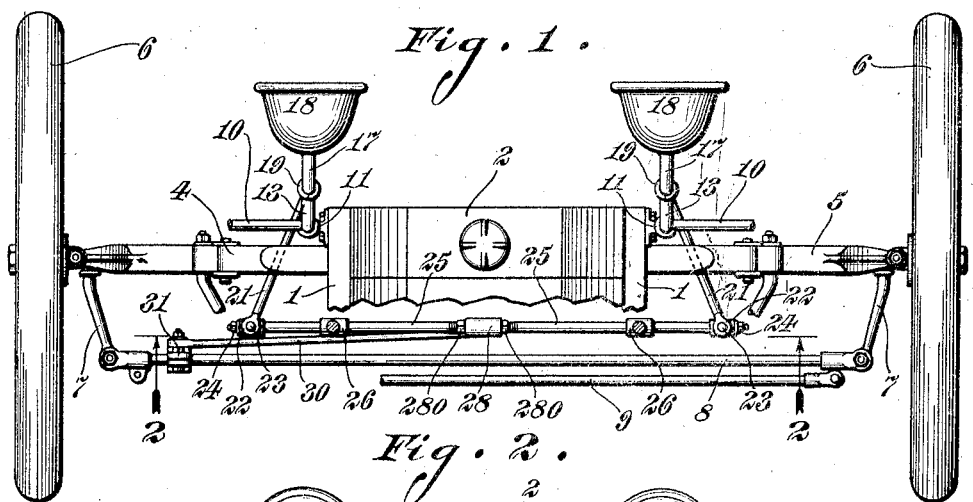
Figure 1 is a plan of a part of an automobile, showing the headlight controlling mechanism embodying this invention.
Figure 2:
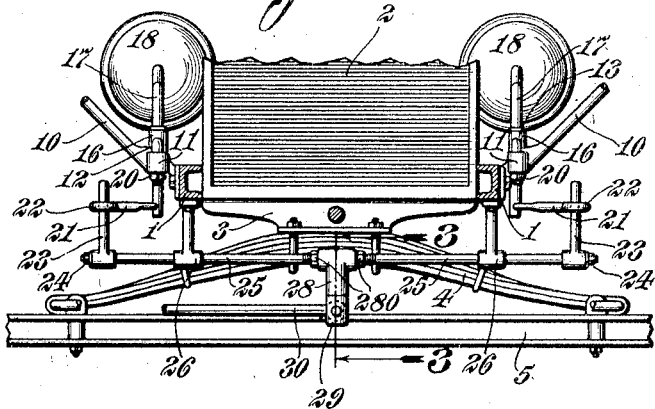
Fig. 2 is a section on the line 2—2, Fig. 1.
Figure 3:
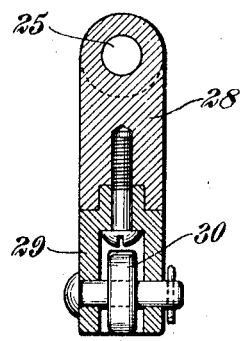
Fig. 3 is an enlarged section on the line 3—3, Fig. 2.
Figure 4:
Fig. 4 is an enlarged detail perspective view.

Referring to the accompanying drawing, 1 designates the side frames of the chassis, which carry the radiator 2, and are connected by a cross-beam 3 supported by springs 4 on the front axle 5. This front axle carries road wheels 6 provided with steering knuckles 7, connected by a steering rod 8, which in turn is connected by a link 9 to the steering wheel. A pair of fender supporting brackets 10 are bolted to the chassis side frames 1, to support the front ends of the fenders. These brackets are flattened near their points of attachment to the chassis side frames to form eyes 11, and these eyes are formed to provide shoulders 12, on one side of the perforation in the eye.

A pair of headlight supports comprising each, a body 13 having a shank 14 adapted to enter the eye with the body at the bend resting at the shoulder 12. The shank 14 is threaded to receive a nut 15 which clamps the support in position. This support extends forwardly from the fender bracket and is provided at its forward end with a bearing 16, adapted to receive the shank 17 of the headlight 18, the shank being provided with a fixed collar 19, and with a nut 20, so as to sustain the headlight for oscillating movement on the support.

Threaded into the lower end of each shank 17 is an arm 21, which has an eye 22 loosely engaging an arm 23, mounted on a reduced portion 24 of an actuator rod 25, arranged parallel with the steering rod 8, and mounted for endwise sliding movement in brackets 26, attached to the underside of the chassis side frames 1. A nut 27 maintains the arm 23 against endwise movement on the rod 25, but permits free oscillating movement thereon. The rod 25 is made in sections, each of which is threaded into a connecting head 28, which has a swiveled head 29, having in turn, a swiveled connection with the link 30, swiveled to a block 31, clamped on the steering rod 8.

It will thus be seen that as the steering rod is moved to move the road wheels, the connections to the headlights will move these headlights in unison with the wheels, the connections being made in such a manner as to direct the rays from the headlights in the direction in which the automobile is turned, so as to illuminate the road in the path to be traversed by the automobile.

The connections from the actuator rod to the headlights, and the connections from the steering rod to the actuator rod, are so constructed as to avoid lost motion, but at the same time, make these connections flexible, so that they will not bend nor be placed under strain on account of the movement between the chassis and the running gear. It will further be seen that the arrangement of the connections is such as to permit adjustment of the headlights to proper alinement. They can be adjusted concurrently by sliding the block 31 on the rod 8; they can be adjusted independently by independently turning the rod sections 25, and then locking them in position by the lock nuts 280; the independent adjustment will not disturb the concurrent adjustment, nor vice versa.

By mounting all of the shifting mechanism and the headlights on the chassis, the parts are supported rigidly and will be kept in relative alinement. This is accomplished by utilizing the fender sustaining brackets as supports for the headlights, and by mounting the actuator rod on the side frames of the chassis. It will, furthermore, be noted that the mechanism is so constructed as to permit its ready application to existing automobiles, without requiring alteration.

It is obvious that various changes may be made in the details of construction without departing from the spirit of this invention. It is, therefore, to be understood that this invention is not to be limited to the specific construction shown and described.

Having thus described the invention, what is claimed is:

In an automobile having a chassis, a steering rod and a pair of headlights mounted for oscillation on the chassis, headlight controlling mechanism comprising a connecting head adjustably connected with the steering rod, rods having independently adjustable joining connections directly with said head and guided for movement on the chassis, and connections between the other ends of said rods and the head lights.

In testimony whereof we affix our signatures this 31st day of January, 1917.

RICHARD C. HAKE.
ANTHONY V. VISSATA.